United States Patent [19]

Leguet et al.

[11] Patent Number: 4,899,580
[45] Date of Patent: Feb. 13, 1990

[54] DEVICE FOR MEASURING THE WAKE OF A SAILING MODEL

[75] Inventors: Pierre L. Leguet, Bures/Yvette; Jean-Claude Dern, Paris, both of France

[73] Assignee: Etat Francais représenté par le Délégué général pour l'armement, Paris, France

[21] Appl. No.: 228,181

[22] Filed: Aug. 4, 1988

[30] Foreign Application Priority Data

Aug. 13, 1987 [FR] France .................. 87 11521

[51] Int. Cl.⁴ .................. G01M 10/00; G01F 23/28
[52] U.S. Cl. .................. 73/148; 250/577
[58] Field of Search .................. 73/148, 866.4, 170 A, 73/293; 356/372, 375, 445–448; 250/573–575, 577; 358/105, 107; 364/504, 510, 556, 560–562

[56] References Cited

U.S. PATENT DOCUMENTS 3,916,813 11/1975 Stahl .................. 73/148 X
3,940,731 2/1976 Cooper et al. .................. 73/861.25

FOREIGN PATENT DOCUMENTS 25760 10/1969 Japan .................. 250/577
102157 8/1979 Japan .................. 73/293
184328 8/1987 Japan .................. 73/148
985819 12/1982 U.S.S.R. .

OTHER PUBLICATIONS

English Abstract of Japanese patent document No. 57-73617 by *Patent Abstracts of Japan;* ABS Grp. No. P135; ABS vol. No: vol. 6, No. 156; ABS Pub. Date Aug. 17, 1982; (patent dated May 8, 1982).

*Primary Examiner*—Tom Noland
*Attorney, Agent, or Firm*—Oliff & Berridge

[57] ABSTRACT

A device for measuring the wake of a sailing model in a trail tank is equiped with a platform capable of pursuing the model in the same direction and at the same speed as the model. The device includes five optical point measurement heads, carried on the platform and capable of moving horizontally with respect to the platform and crosswise with respect to the direction of pursuit of the model, thereby scanning the wake transversely and measuring the water surface undulation due to the model wake, in five adjacent vertical parallel planes forming a strip.

8 Claims, 2 Drawing Sheets

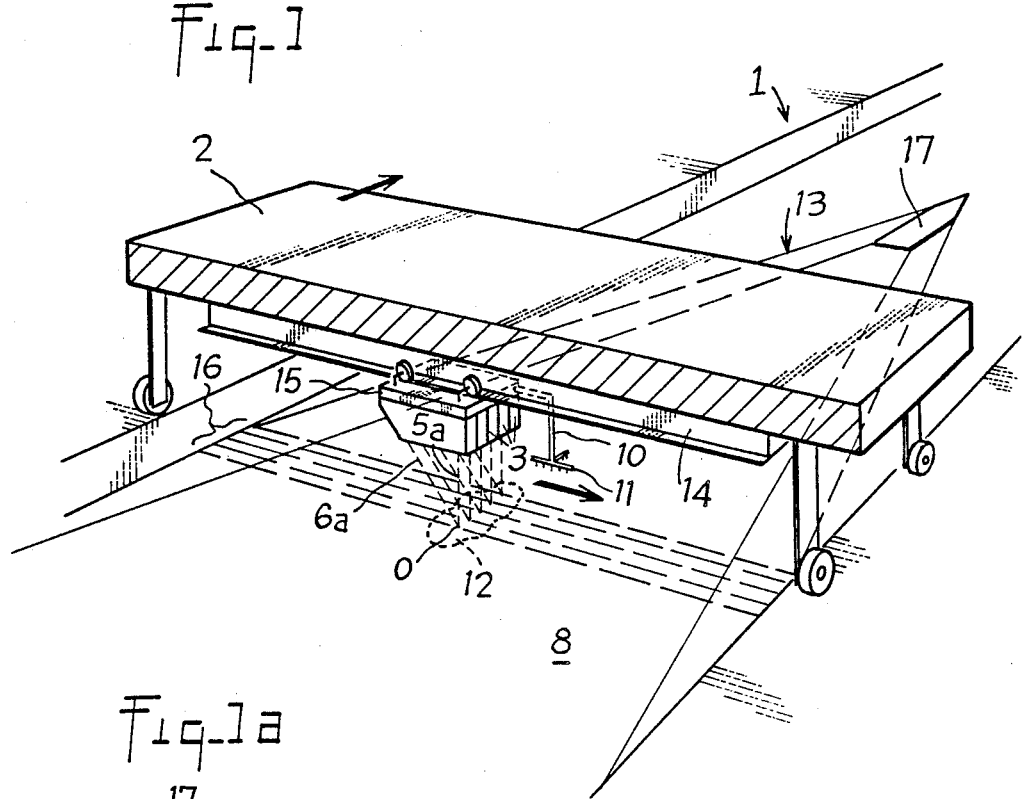
Fig-1
Fig-1a
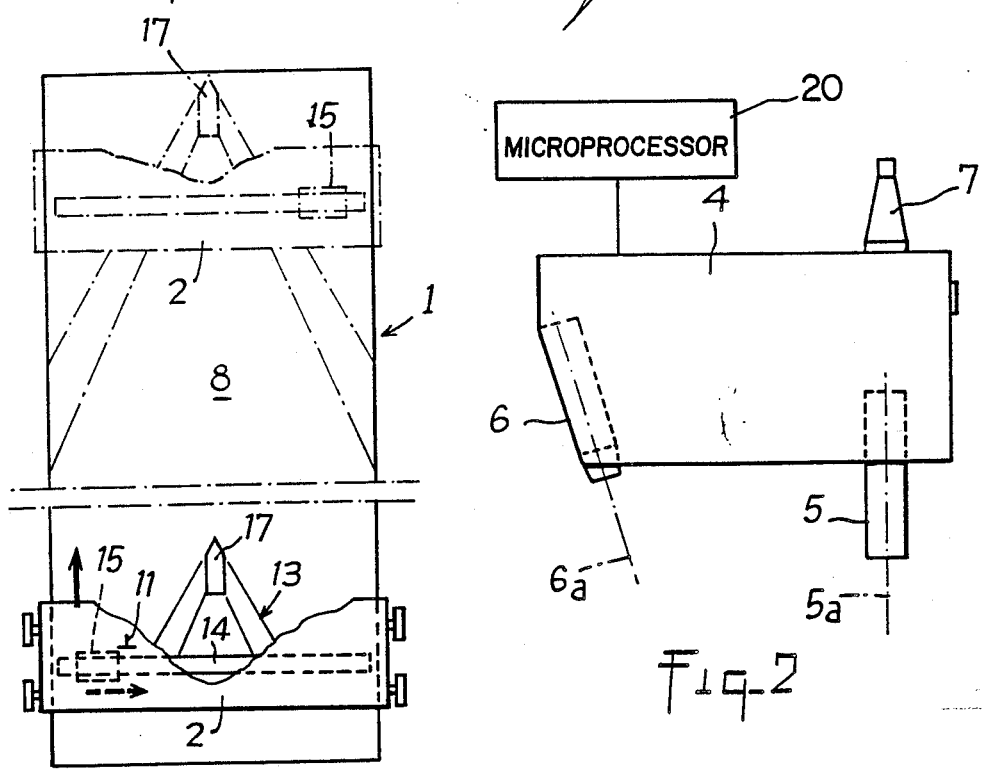
Fig-2

DEVICE FOR MEASURING THE WAKE OF A SAILING MODEL

BACKGROUND OF THE INVENTION

1. Field of the Invention

The present invention relates to a device for measuring the wake of a sailing model in a trial tank equipped with a mobile platform capable of following the model in the same direction and at the same speed as the model.

2. Description of the Prior Art

There are major problems in measuring the wake of a ship model by the shape of the wave field created with the movement of the model through the trial tank, because of the extent of the field (several square meters) and of the large number of measurement points to be recorded.

SUMMARY OF THE INVENTION

The purpose of the invention is to remedy these difficulties by means of a device that measures the water level at a point by determining the variable height of a point area on the surface of the water, operating without coming into material contact with the water, and moving with a scanning motion.

According to the invention, this device includes at least one optical measurement head measuring the water level at a point which is carried on the platform and is capable of moving horizontally with respect to the platform and transversely with respect to the direction of the platform motion as it pursues the model. This device provides by transverse scanning, a measurement of the water surface undulations due to the wake of the model in a vertical plane parallel to the said transverse direction, which is preferably perpendicular to the direction of pursuit motion of the platform.

Such a device provides a solution to the above problems. The solution consists, firstly, by adopting the hypothesis that the field of waves due to the wake is stationary in a platform-linked frame of reference, and then taking a series of point measurements of the water height along an axis transverse to the direction of motion of the model, and preferably perpendicular to the said direction.

Advantageously, the device includes a group of preferably more than three measurement heads juxtaposed in line with the direction of pursuit motion of the platform, which provides a measurement of the said undulations in as many vertical, parallel and adjacent planes as there are measurement heads. This arrangement makes it possible to measure the height of the water simultaneously at a number of points at least equal to four.

In a preferred embodiment, each measurement head includes a laser emitting a light beam, preferably vertically, which strikes the surface of the water, creating a spot of light, and one camera with an opto-electronic sensitive surface and the optical axis directed preferably obliquely toward the median position of the said light spot, making a fixed angle with the laser beam, and which supplies an output signal translating the difference between the image of the spot formed on its sensitive surface and its optical axis, this signal being processed in such a way that the variable height of the spot on the surface of the agitated water can be found by computation.

To increase the visibility of the light spot at the point where each laser beam strikes the surface of the water, it is helpful to use a spray device that projects droplets onto the surface of the water in the region of the light spot or spots.

BRIEF DESCRIPTION OF THE DRAWING

A better understanding of the present invention may be had from a consideration of the following detailed description, taken in conjunction with the accompanying drawing in which:

FIG. 1 is a perspective view of a part of a ship model trial tank equipped with a moving platform carrying a measuring device according to the invention.

FIG. 1a is a smaller scale platform diagram of the trial tank in FIG. 1

FIG. 2 is a larger scale schematic lateral elevation view of one measurement head of the measuring device of FIG. 1.

DETAILED DESCRIPTION

Figure 3:
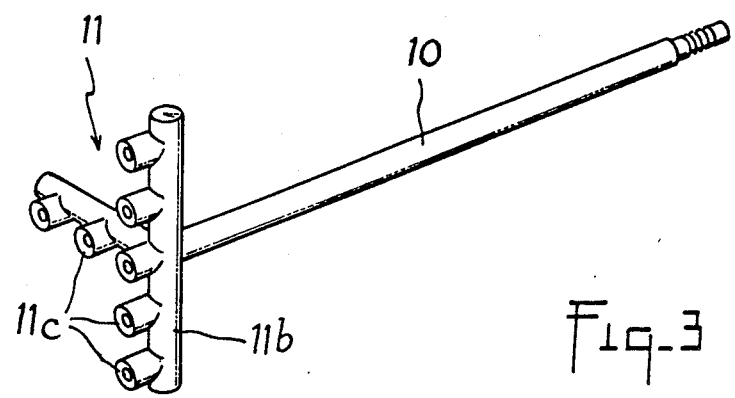
FIG. 3 is a larger scale prospective of the spraying device used with the measuring device of FIG. 1.

FIG. 1 shows part of a rectangular trial tank 1 with mobile platform 2 spanning it widthwise and capable of moving lengthwise following test model 17 as the model moves through the tank. Beam 14 is fastened under the platform 2 and extends across the tank, with shuttle 15 moving along the said beam. The shuttle supports a group of five measurement heads 3 designed to measure the water level in the trial tank at points directly under the heads, with the water level variations being related to the wake 13 of the model 17.

Each of the measurement heads 3 includes (FIG. 2), in a casing 4, one continuous-emission laser 5 and one CCD type camera 6 of the matrix or single line type, with their respective optical axes 5a, 6a converging. The five casings 4 are juxtaposed under shuttle 15 and are made integral with it by spigot 7, in a situation such that the optical axes 5a of lasers 5 are vertical and contained within the same plane parallel to the motion of platform 2, and that the optical axes 5a, 6a of the laser and camera of each measurement head 3 converge to a respective point O located at the level of the surface 8 of the tank water when the water is at rest.

Near the group of measurement heads, fastened to shuttle 15 by rigid supply tube 10, a spray device 11 (FIGS. 1 and 3) is provided to spray a liquid on the tank water surface with several nozzles 11c on cross-tubes 11b, in an area 12 surrounding the points O relative to the five measurement heads 3. The sprayed liquid, which may be water, dulls the surface of the water and thereby helps diffuse the light from the laser beams striking this surface.

Figure 4:
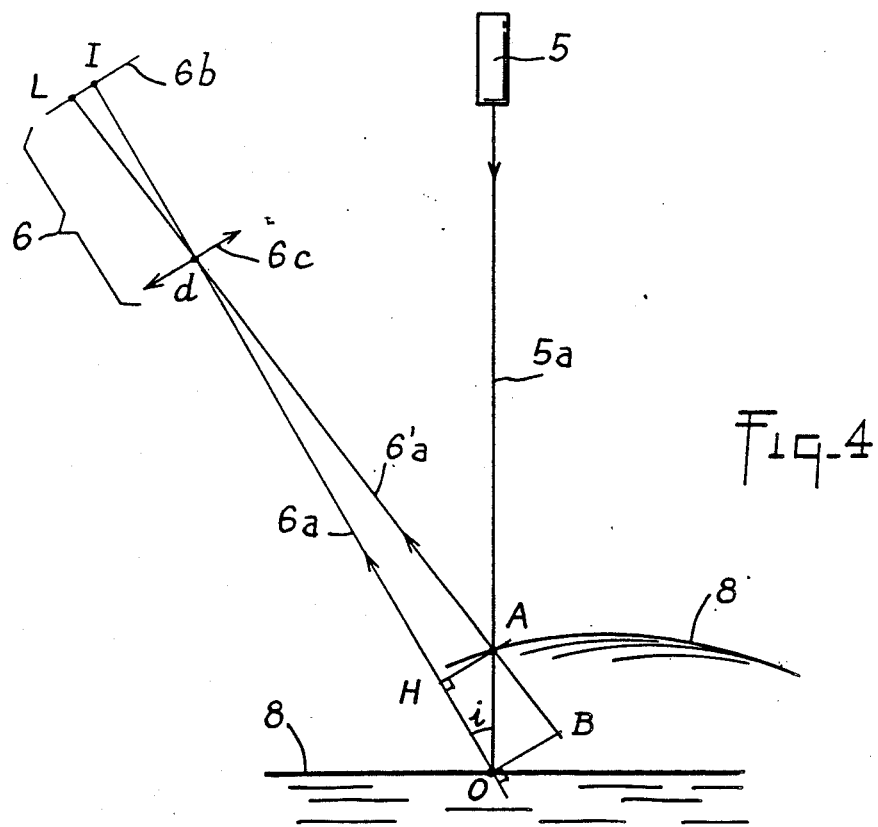
FIG. 4 illustrates the principle of geometric determination of the height variations of a point on the surface of the water in the trial tank from signals delivered by one level measurement head.

In accordance with FIG. 4, when the tank water is calm, the beam from laser 5 creates a spot of light on point O at the surface 8 of the water, from which the camera 6 forms an image at the center I of its sensitive surface 6b. Because of the wake, the water surface deforms and comes to be located for example at 8' over the mean surface 8, with the light spot rising from point O to a point A, while the image of the light spot on the sensitive surface 6b of the camera moves to a point L.

Designating by d the center of the objective 6c of the camera 6, with i being the angle between the optical axes 5a and 6a, the similar right triangles d O B, d H A and d I L and the right triangle O H A allows us to say:

$$OA = \frac{Od \cdot IL}{IL \cdot \cos i + Id \cdot \sin i}$$
$$= \frac{n}{n \cdot K_1 + K_2}$$

where $K_1 = \frac{\cos i}{Od}$, $K_2 = \frac{Id \cdot \sin i}{e \cdot Od}$ and $n = \frac{IL}{e}$, with e designating the width of an image element, or pixel, on the sensitive surface 6b of the camera in the direction of the segment IL.

From the signal emitted by camera 6, the number n of pixels, the light spot image covered when moving from O to A is computed, and from this, the elongation of A is computed by a programmed microprocessor 20, knowing the values of the constant $K_1$ and $K_2$ that are fixed by the geometric configuration of the optical system.

The vertical displacements of the point on the water surface undulated by wake 13, located plumb under laser 5, can thus be followed. Because of the motion imparted to shuttle 15 along beam 14, this point moves from one edge of the tank 1 in a vertical plane perpendicular to the direction of advance of the model 17, with this plane also being stationary with respect to the model thanks to the pursuing motion of the platform. It follows that the signal output by the measurement head is considered representative of a curve having a level corresponding to the intersection of the water surface with the said vertical plane. Similarly, the other measurement heads 3 supply signals representative of level curves in parallel vertical plane adjacent to each other.

Therefore, as shuttle 15 runs along beam 14 while platform 2 pursues model 17 moving at the same speed as the model, the five measurement heads 3 produce five level curves expressing the undulations of the water surface under the effect of the model wake through a transverse strip 16 at a constant, but adjustable, distance from the model 17.

In practice, it is best to have the shuttle 15 travel the length of the beam 14 in the time it takes the platform 2 to travel the length of the tank 1, so that the shuttle 5 moves approximately along a diagonal of the tank.

The system is managed by a microcomputer, which is connected to five measurement heads 3 by means of an electronic interface that monitors the measurement heads and transfers the data to the central storage in the computer. This data is processed to establish a veritable topographic map of the water surface rippled by the wake of the sailing model.

What we claim is:

1. Device for measuring the wake of a model sailing in a trial tank equipped with a moving platform capable of pursuing the model in the same direction and at the same speed as the model, wherein said measuring device includes at least one optical measuring head measuring the water level corresponding to at least one local point and being carried by the platform and capable of moving horizontally with respect to said platform in a transverse direction with respect to the direction of its motion of pursuit of the model, in such a way as to provide by transverse scanning a measurement of the undulations of the water surface due to the wake of the model in a vertical plane parallel to said transverse direction.

2. Device according to claim 1, wherein said transverse direction is perpendicular to the direction of pursuit of the platform.

3. Device according to claim 2, wherein said at least one optical measuring head comprises includes a group of several juxtaposed measuring heads following the pursuing direction of the platform, which provides a measurement of said undulations in as many vertical, parallel and adjacent planes.

4. Device according to claim 3, wherein the number in said group is at least four.

5. Device according to claim 4, wherein each measuring head includes a laser emitting a light beam that strikes the surface of the water, forming a light spot on it, and one camera with an opto-electronic sensitive surface, the optical axis of the camera is directed toward the median position of said light spot, making a fixed angle with the light beam of the laser, said camera provides an output signal expressing the difference between the image of the spot formed on the sensitive surface of the camera with respect to its optical axis, this signal being processed so as to determine from it by calculation the variable height of the spot on the surface of the agitated water.

6. Device according to claim 5, wherein the light beam emitted by each laser falls vertically onto the surface of the water.

7. Device according to claim 6, whereupon the optical axis of each camera is oblique with respect to the vertical.

8. Device according to claim 7, wherein the group of measuring heads are associated with a spray device which projects droplets of liquid onto the surface of the water in the region of the light spots.

* * * * *